(12) United States Patent
Xie

(10) Patent No.: US 11,243,412 B2
(45) Date of Patent: Feb. 8, 2022

(54) ASSEMBLY FOR EYEGLASSES TEMPLE

(71) Applicant: Rongzhou Xie, Wenzhou (CN)

(72) Inventor: Rongzhou Xie, Wenzhou (CN)

(73) Assignee: Wenzhou Ruilin Glasses Co., Ltd., Wenzhou (CN)

( * ) Notice: Subject to any disclaimer, the term of this patent is extended or adjusted under 35 U.S.C. 154(b) by 214 days.

(21) Appl. No.: 16/672,544

(22) Filed: Nov. 4, 2019

(65) Prior Publication Data

US 2021/0096395 A1 Apr. 1, 2021

(30) Foreign Application Priority Data

Sep. 30, 2019 (CN) .......................... 201910945876.6

(51) Int. Cl.
*G02C 5/16* (2006.01)
*G02C 5/22* (2006.01)

(52) U.S. Cl.
CPC .............. *G02C 5/16* (2013.01); *G02C 5/2218* (2013.01)

(58) Field of Classification Search
CPC .... G02C 5/16; G02C 5/2218; G02C 2200/26; G02C 5/2236
See application file for complete search history.

(56) References Cited

U.S. PATENT DOCUMENTS

| 2003/0020867 | A1* | 1/2003 | Dei Negri | ............ | G02C 5/2245 |
| | | | | | 351/153 |
| 2008/0074609 | A1* | 3/2008 | Ifergan | ................. | G02C 5/2227 |
| | | | | | 351/153 |
| 2009/0047061 | A1* | 2/2009 | Chene | .................. | G02C 5/2236 |
| | | | | | 403/65 |

FOREIGN PATENT DOCUMENTS

| CN | 2257031 | Y | 6/1997 |
| CN | 2643342 | Y | 9/2004 |
| CN | 1841131 | A | 10/2006 |
| CN | 1864916 | A | 11/2006 |
| CN | 2862074 | Y | 1/2007 |
| CN | 201000515 | Y | 1/2008 |
| CN | 202600281 | U | 12/2012 |
| CN | 202735610 | U | 2/2013 |
| CN | 203259733 | U | 10/2013 |
| CN | 204389801 | U | 6/2015 |
| CN | 105372830 | A | 3/2016 |
| CN | 105425412 | A | 3/2016 |
| CN | 205301727 | U | 6/2016 |
| CN | 205750152 | U | 11/2016 |
| CN | 206757214 | U | 12/2017 |
| CN | 208477233 | U | 2/2019 |
| CN | 209198797 | U | 8/2019 |

* cited by examiner

*Primary Examiner* — Cara E Rakowski
(74) *Attorney, Agent, or Firm* — Minder Law Group; Willy H. Wong

(57) ABSTRACT

An assembly for eyeglasses temple includes a first connecting rod and a second connecting rod each having an elastic component, outer ends of the two elastic components are hooked to each other to cause the second connecting rod and the first connecting rod abut against each other. A protrusion is provided on an end portion of the second connecting rod, when the second connecting rod is rotated to a position perpendicular to the first connecting rod, the protrusion is inserted in and limited by an outer peripheral side surface of an end portion of the first connecting rod.

8 Claims, 6 Drawing Sheets

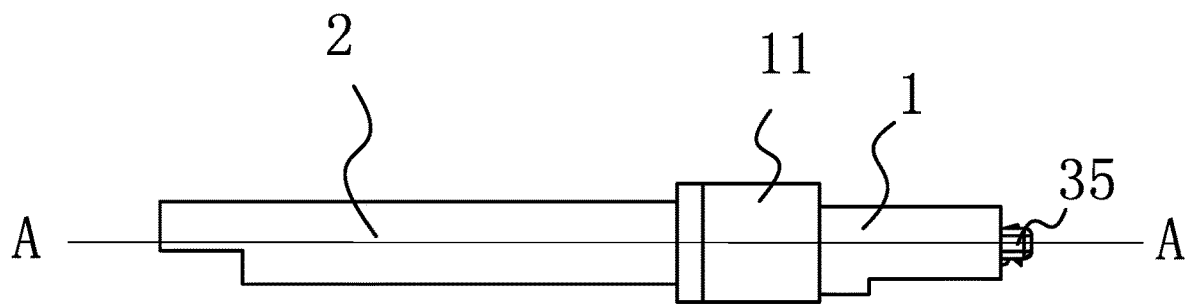
FIG. 3
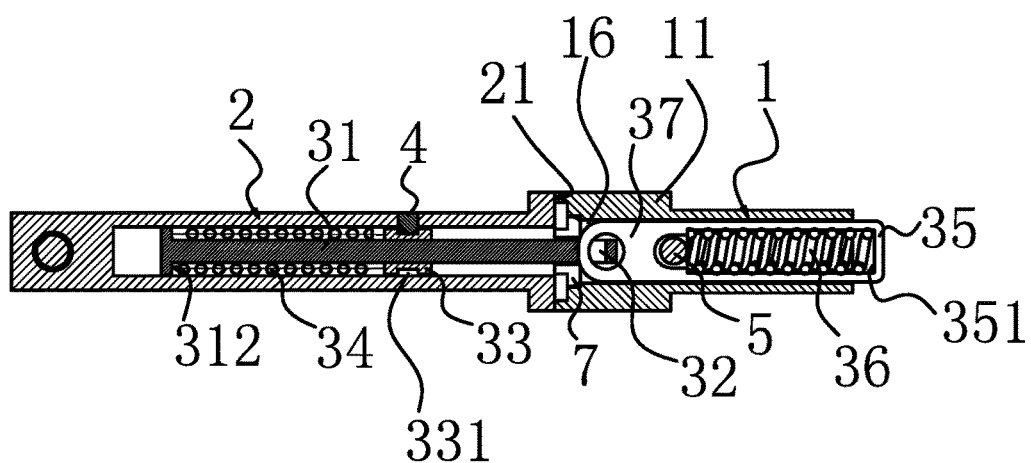
FIG. 4
FIG. 5

ASSEMBLY FOR EYEGLASSES TEMPLE

RELATED APPLICATIONS

This application claims benefit of Chinese Patent Application No. CN201910945876.6, filed Sep. 30, 2019.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention belongs to the field of machinery and relates to a hinge assembly of an eyeglasses temple, and more particularly to a hinge assembly for free rotation.

Related Art

A pair of eyeglasses are composed of a lens frame and two eyeglasses temples, the eyeglasses temples are connected to the lens frame and the eyeglasses temples can be folded relative to the lens frame. On this basis, in order to wear comfortably and prevent the eyeglasses temples from breaking, the eyeglasses temples are made to be eyeglasses temples with elasticity. There are two main methods to implement elastic eyeglasses temple: one method is to directly use screws or rivets for hinged connection between the eyeglasses temple and the lens frame, and the eyeglasses temple itself is made of materials with elasticity, which can maximize movement of the eyeglasses temple and increase comfort for wearing; the second method is to dispose a hinge assembly between the eyeglasses temple and the lens frame, thereby 360-degree rotation can be achieved through hinged connections and elastic structures in the hinge assembly to increase wear comfort.

In one prior art, an eyeglasses temple capable of rotating 360 degrees is disclosed, which includes an eyeglasses temple, a head portion, and a connecting body disposed between the eyeglasses temple and the head portion, which are equivalent to the hinge assembly of the present invention. Inside the head portion is provided with an elastic component, the elastic component is a conventional elastic component. The structure is composed of a positioning cylinder, a positioning rod with a positioning disc as well as a second spring, the positioning cylinder is fixed in the head portion, and the second spring acts on the positioning disc and the positioning cylinder to contract the positioning rod inwardly toward the head portion. An outer end portion of the elastic component forms a hinged connection with the connecting body, so that the connecting body abuts against the head portion under action of the second spring. Since it is a hinged connection, the hinged connection axis is in a horizontal direction, and the connecting body can swing up and down relative to the head portion. On this basis, the eyeglasses temple and the connecting body are hingedly connected, and the hinged connection axis is in a vertical direction, the eyeglasses temple swings left and right relative to the connecting body, so that the eyeglasses temple can be rotated 360 degrees. A positioning structure composed of a first spring and a butt column is further disposed in the eyeglasses temple, and under action of elastic force, the butt column is pushed against the connecting body to prevent the eyeglasses temple from rotating freely.

The above-mentioned hinge assembly can be modified. For example, instead of using the elastic component structure in the head portion, the positioning structure composed of the spring and the butt column is used, that is, the eyeglasses temple is hingedly connected with the connecting body, and the positioning structure is used for rotational angle positioning. The head portion uses the connecting body for hinged connection and uses the positioning structure for rotational angle positioning, such as in an elastic eyeglasses temple disclosed in the prior art.

In addition to the above-mentioned modified structure, another modification may be proposed, that is, the head portion and the elastic component are kept unchanged, and the positioning structure is changed to an elastic component, that is, both the eyeglasses temple and the head portion are connected with the connecting body through the elastic component.

All of the above structures can realize 360-degree rotation of the hinge assembly, but the stability of such types of hinge assembly needs to be further improved. The main reason is that the structure of the connecting body is relatively complicated, and requirements for the manufacturing and assembly technics are high. Moreover, in the course of 360-degree rotation, it is realized by two hinged connection structures of the connecting body, and when abnormality occurs in one of the hinge axes, the hinge assembly is abnormal. And after rotation, these positionings are relied on the elastic component to directly push against the head portion or the eyeglasses temple to limit position, which is prone to unstable positioning.

SUMMARY OF THE INVENTION

The present invention provides an assembly for eyeglasses temple for the above problems in the prior art. One technical problem to be solved by the present invention is how to improve the stability of the assembly for eyeglasses temple.

One object of one embodiment of the present invention can be achieved by the following technical solutions:

One embodiment of an assembly for eyeglasses temple includes a first connecting rod and a second connecting rod each having an elastic component, outer ends of the two elastic components are hooked to each other to cause the second connecting rod and the first connecting rod abut against each other, wherein a protrusion is provided on an end portion of the second connecting rod, when the second connecting rod is rotated to a position perpendicular to the first connecting rod, the protrusion is inserted in and limited by an outer peripheral side surface of an end portion of the first connecting rod.

One embodiment of the present invention adopts the dual elastic components for direct hook connection, and springs in the elastic components act on the first connecting rod and the second connecting rod, so that end faces of the first connecting rod end and the second connecting rod abut and press against each other tightly. When an eyeglasses temple is in an unfolded state, the first connecting rod and the second connecting rod are in a straight line on a same axis. Since the two elastic components are directly hooked together, the second connecting rod can be rotated in any direction relative to the first connecting rod when the two elastic components are elastically deformed. When the second connecting rod is rotated by 90°, and the second connecting rod is perpendicular to the first connecting rod, the eyeglasses temple is in a folded state. In this state, through an elasticity of the elastic component, the second connecting rod is pressed tightly on the outer peripheral side surface of the end portion of the first connecting rod. On this basis, the protrusion is inserted in the outer peripheral side surface of the end portion to cause the protrusion to be limited by the outer peripheral side surface of the end portion, and vertical movement of the second connecting rod is prevented. Thus the second connecting rod and the first connecting rod are maintained in a perpendicular state with high stability.

On the basis of increasing a degree of freedom of hook connection of one embodiment of the dual elastic components, an inserting structure for enhancing stability is respectively designed between the first connecting rod and the second connecting rod, and the inserting structures are made independent of the elastic components, so that the first connecting rod and the second connecting rod have a higher freedom for separation. When the second connecting rod is rotated to combine with the first connecting rod, it is easier for the protrusion to be inserted in and limited by the outer peripheral side surface of the end portion of the first connecting rod. The hook connection in this specification means that two ring members or hooks similar to the ring members are directly fastened or hooked together, which greatly increases a degree of freedom compared with axial pivotal connection.

In one embodiment of the above-mentioned assembly for eyeglasses temple, the outer peripheral side surface of the end portion of the first connecting rod have two blocking walls disposed in parallel to each other, and the protrusion is inserted and limited between the two blocking walls. Both symmetrical sides of the protrusion are limited by the blocking walls to increase stability of the second connecting rod and the first connecting rod.

In one embodiment of the above-mentioned assembly for eyeglasses temple, a width of the protrusion is slightly smaller than a spacing between the two blocking walls. In this way, it facilitates inserting the protrusion between the blocking walls when being folded.

In one embodiment of the above-mentioned assembly for eyeglasses temple, brims of the two blocking walls are in one plane, the end portion of the second connecting rod is a plane, and the end portion of the second connecting rod abuts on the brims. After the second connecting rod is bent, under action of the elastic component, the end portion of the second connecting rod is abutted on the brims; since both the brims and the end portion are planes, a resistance of translation over a dead point can be reduced. At the same time, the two planes abutting against each other are capable of preventing the second connecting rod from rebounding back to the unfolded state and maintaining stability in the folded state.

In one embodiment of the above-mentioned assembly for eyeglasses temple, a block portion is disposed between the outer peripheral side surface of the end portion of the first connecting rod and the end portion of the second connecting rod capable of preventing the second connecting rod from disengaging from the blocking walls. The second connecting rod is prevented from moving and then disengaging by the block portion.

In one embodiment of the above-mentioned assembly for eyeglasses temple, the block portion is a limiting surface disposed between ends of the two blocking walls, the protrusion is capable of abutting against the limiting surface, or the block portion is a blocking boss disposed at an end of the protrusion, and the blocking boss is capable of abutting against starting ends of the blocking walls. These two structures are equivalent replacement structures for positional exchange, and capable of achieving anti-disengaging effect. Under action of the elastic component, the protrusion is capable of translating over a dead point between the blocking walls and abutting against the limiting surface, so that the protrusion is limited on the limiting surface between the two blocking walls to form a stable state to increase stability.

In one embodiment of the above-mentioned assembly for eyeglasses temple, the end portion of the first connecting rod is a hollow structure, a groove is provided on inner walls of the end portion for guiding the elastic component in a contracting direction, the elastic component disposed in the first connecting rod comprises a strip-shaped slide rod, the slide rod is provided with a strip-shaped guide channel in an axial direction, a coil spring is provided in the guide channel capable of acting between an inner end of the slide rod and the first connecting rod to contract the slide rod inwardly, and the slide rod is disposed in the groove. By disposing the coil spring in the slide rod, and disposing the slide rod in the groove, an outer peripheral surface of the coil spring is limited to prevent the coil spring from being bent and deformed, thereby maintaining elasticity and improving stability.

In one embodiment of the above-mentioned assembly for eyeglasses temple, the first connecting rod is fixed with a bolt, and the bolt projects into the guide channel of the slide rod and one end of the coil spring acts on the bolt. In addition to guiding the elastic component through the groove, the elastic component is auxiliarily guided by a bolt shaft and the guide channel, so that the elastic component is guided on inner side and outer side to ensure stability.

In one embodiment of the above-mentioned assembly for eyeglasses temple, an end face of the end portion of the first connecting rod is adjacent to and perpendicular to the outer peripheral side surface of the end portion on which the blocking walls are located, and the starting ends of the blocking walls are flush with the end portion of the first connecting rod. With this structure, it facilitates the protrusion to be inserted in and limited by the outer peripheral side surface of the end portion of the first connecting rod.

In one embodiment of the above-mentioned assembly for eyeglasses temple, a bottom between the blocking walls is provided with a passage for movement of the elastic component.

In one embodiment of the above-mentioned assembly for eyeglasses temple, a position at which the elastic components are hooked with each other is located in a cavity of the end portion. The position of hooking with each other is protected to prevent dust and impurities from entering the hooking position to improve stability.

In one embodiment of the above-mentioned assembly for eyeglasses temple, the elastic component disposed in the second connecting rod comprises a shaft with an inner end having a flange, an outer end of the shaft is provided with a split ring, a bushing is fixed in the second connecting rod, the shaft is inserted in the bushing and around the shaft is sleeved with a spring having one end acting on the flange and another end acting on the bushing, the split ring protrudes outside of the second connecting rod and is fastened to the slide rod.

Compared with the prior art, one embodiment of the assembly for eyeglasses temple of the present invention has the following advantages:

1. The present invention is connected by means of the two elastic components being hooked with each other, which greatly increases a degree of freedom of connection and simplifies the assembly difficulty.

2. Through the outer peripheral side surface of the end portion of the first connecting rod with cooperation between the groove and the slide rod, as well as cooperation between the bolt and the slide rod, the first connecting rod and the second connecting rod of the present invention can be stably and smoothly rotated even when the hook connection is employed; and with the protrusion on the second connecting rod being inserted in and limited by the outer peripheral side surface of the end portion of the first connecting rod, the present invention can have better stability even in the case of having greater degree of freedom.

BRIEF DESCRIPTION OF THE DRAWINGS

FIG. 3 is a top view of FIG. 1;

FIG. 4 is a cross-sectional structural view of A-A in FIG. 3;

FIG. 5 is a perspective view of an end portion of a second connecting rod with the inserted elastic component according to the first embodiment of the present invention;

DETAILED DESCRIPTION OF THE INVENTION

The technical solutions of the present invention are further described below with reference to the specific embodiments of the present invention in conjunction with the accompanied drawings, but the present invention is not limited to the embodiments.

Embodiment 1

Figure 1:
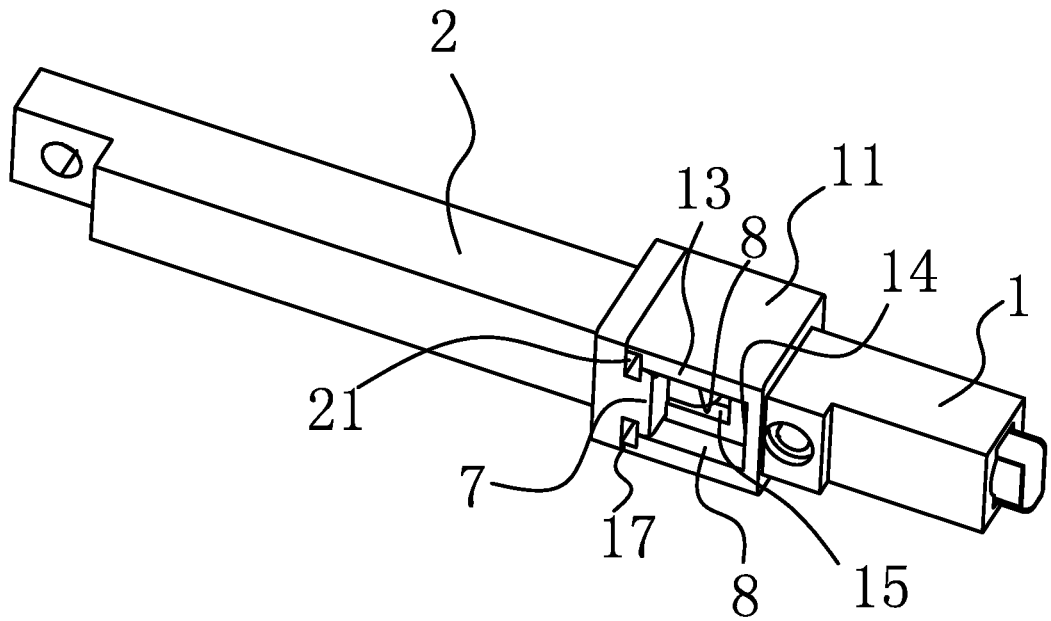
FIG. 1 is a perspective view of an assembly for eyeglasses temple according to a first embodiment of the present invention.

One embodiment of an assembly for eyeglasses temple shown in FIG. 1 is used for connecting between an eyeglasses frame and an eyeglasses temple. In this embodiment, a first connecting rod 1 is used for connecting with the eyeglasses frame, and after being fixedly connected to the eyeglasses frame, the first connecting rod 1 is substantially perpendicular to the eyeglasses frame. A second connecting rod 2 is used for connecting with the eyeglasses temple, and is connected to the eyeglasses temple on a same axis as the eyeglasses temple. The assembly for eyeglasses temple in FIG. 1 is in an unfolded state, through the assembly for eyeglasses temple, the eyeglasses temple can be substantially perpendicular to the eyeglasses frame and is in an unfolded wearable state. The first connecting rod 1 and the second connecting rod 2 are movable and can be folded by a substantially right angle. After the second connecting rod 2 is folded relative to the first connecting rod 1, the eyeglasses temple connected to the second connecting rod 2 is in a folded state.

Figure 2:
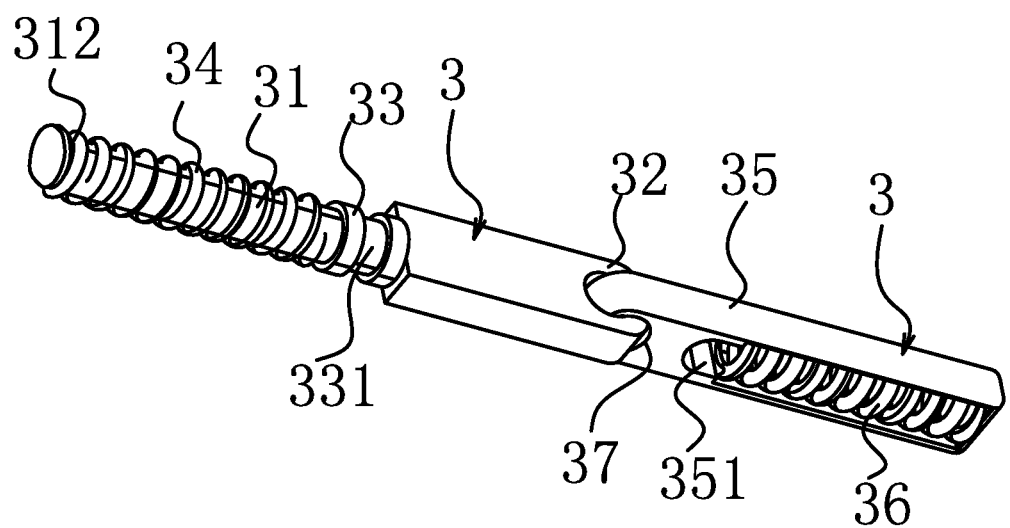
FIG. 2 is a perspective view of one embodiment of the invention in which two elastic components are hooked with each other.

As shown in FIG. 2, inside one embodiment of the first connecting rod 1 and the second connecting rod 2 are each provided with an inwardly contracting elastic component 3. The elastic component 3 disposed in the second connecting rod 2 includes a shaft 31 with an inner end having a flange 312, and the flange 312 is formed by an enlarged portion of a bottom of the shaft 31. An outer end of the shaft 31 is provided with a split ring 32, and a bushing 33 is sleeved around an end of the shaft 31 adjacent to the split ring 32. Around the shaft 31 is sleeved with a spring 34 having one end acting on the flange 312 and another end acting on the bushing 33. The elastic component 3 disposed in the first connecting rod 1 also adopts a similar structure including a strip-shaped slide rod 35. The slide rod 35 is provided with a strip-shaped guide channel 351 in an axial direction, a coil spring 36 is provided in the guide channel 351 capable of acting between an inner end of the slide rod 35 and the first connecting rod 1 to contract the slide rod 35 inwardly. An outer end of the slide rod 35 is a connecting ring 37, the connecting ring 37 of the slide rod 35 and the split ring 32 at the outer end of the shaft 31 are hooked with each other, and after the slide rod 35 and the shaft 31 are hooked with each other, the two can freely move 360 degrees.

As shown in FIG. 3 and FIG. 4, one embodiment of the two elastic components 3 are respectively inserted into the first connecting rod 1 and the second connecting rod 2, and an outer side of the bushing 33 is disposed with an annular groove 331. After the bushing 33 is inserted into a mounting cavity of the second connecting rod 2, a pin 4 is inserted into the annular groove 331 from outside of the second connecting rod 2, and the bushing 33 is fixed. Under action of the coil spring 36, the shaft 31 produces an inward contraction force. A bolt 5 is fixed in the first connecting rod 1, and the bolt 5 projects into the guide channel 351 of the slide rod 35 and one end of the coil spring 36 acts on the bolt 5. Under action of the spring 34, the slide rod 35 also generates an inward contraction force, since the slide rod 35 and the shaft 31 are hooked to each other, the spring 34 in the second connecting rod 2 and the coil spring 36 in the first connecting rod 1 counteract on the first connecting rod 1 and the second connecting rod 2. As a result, an end portion 11 of the first connecting rod 1 and an end portion 21 of the second connecting rod 2 abut against each other, that is, the first connecting rod 1 and the second connecting rod 2 are connected by the two elastic components 3, as shown in a state in FIG. 1.

As shown in FIG. 5, one embodiment of the end portion 21 of the second connecting rod 2 is a plane, and a protrusion 7 is provided on a middle of the end portion 21, and edge portions of the end portion 21 are used for abutting against the first connecting rod 1. The split ring 32 is flat, and a guider through hole 23 for guiding the split ring 32 is formed in the protrusion 7. The guider through hole 23 can be a complete through hole, or can be two groove structures to form a shape similar to a through hole, and the split ring 32 is capable of projecting outside of the second connecting rod 2 to be hooked with the slide rod 35.

Figure 6:
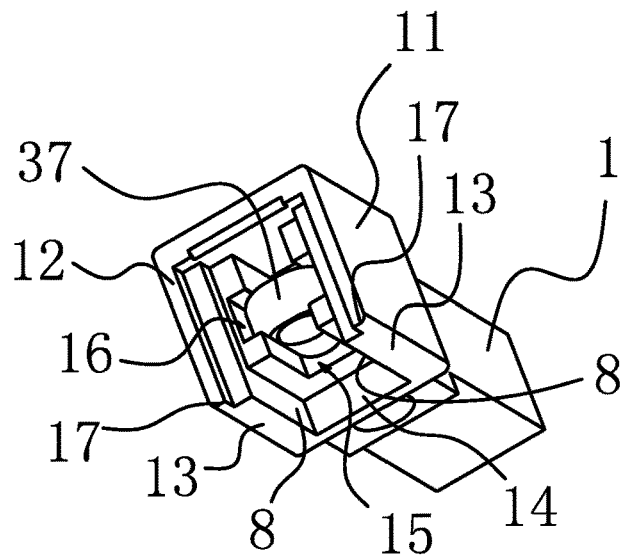
FIG. 6 is a perspective view of an end portion of a first connecting rod with the inserted elastic component according to the first embodiment of the present invention.

As shown in FIG. 6, one embodiment of an end face 12 of the end portion 11 of the first connecting rod 1 is a square annular end face, and two blocking walls 8 are provided on an outer peripheral side surface of the end portion 11 along a contraction direction of the elastic component 3. Brims 13 of the blocking walls 8 are straight strip-shaped planes, the two blocking walls 8 are flush with the end face 12 of the end portion 11 of the first connecting rod 1, and the end face 12 of the end portion 11 of the first connecting rod 1 is adjacent to and perpendicular to the outer peripheral side surface of the end portion 11 on which the blocking walls 8 are located. Portions where the blocking walls 8 crisscrossing with the end face 12 are starting ends of the blocking walls 8, a limiting surface 14 is disposed between ends of the blocking walls 8 for preventing the two blocking walls 8 from connecting with each other, and the limiting surface 14 is a block portion disposed between the outer peripheral side surface of the end portion 1 of the first connecting rod 1 and the end portion 21 of the second connecting rod 2 capable of preventing the second connecting rod 2 from disengaging from a guiding structure. A bottom between the blocking walls 8 is provided with a passage 15 for movement of the elastic component 3, and a width between the blocking walls 8 is greater than a width of the passage 15 on a folded positioning surface. The end portion 11 of the first connecting rod 1 is a hollow structure, and a groove 16 is provided on inner walls of the end portion 11 for guiding the slide rod 35 in a contracting direction. The groove 16 is formed by protruding ribs or is formed between blocking walls disposed on the protrusion 7. The slide rod 35 is disposed in the groove 16, and the connecting ring 37 projects outside of the groove 16 to be hooked with the split ring 32 of the shaft 31.

Figure 7:
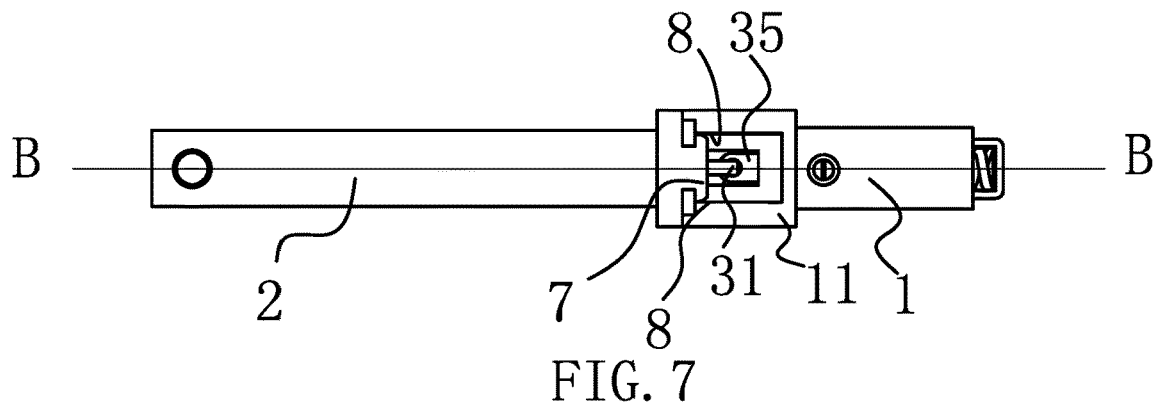
FIG. 7 is a front view of FIG. 1.
Figure 8:
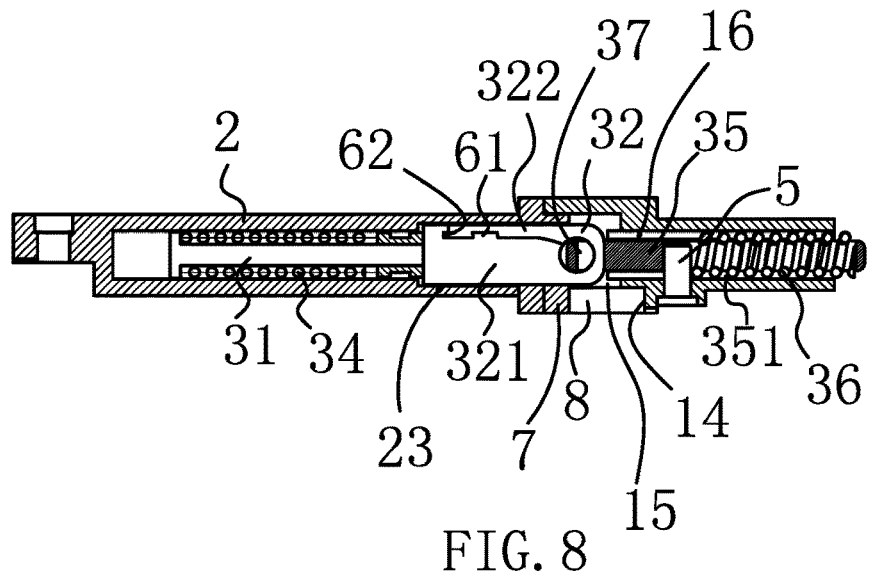
FIG. 8 is a cross-sectional structural view of B-B in FIG. 7.
Figure 9:
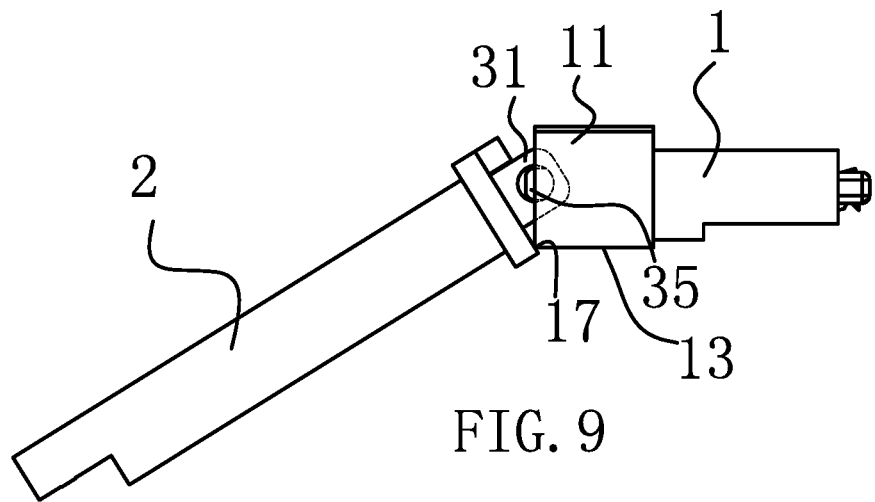
FIG. 9 is a top view of FIG. 1 with the second connecting rod being rotated by a certain angle.
Figure 10:
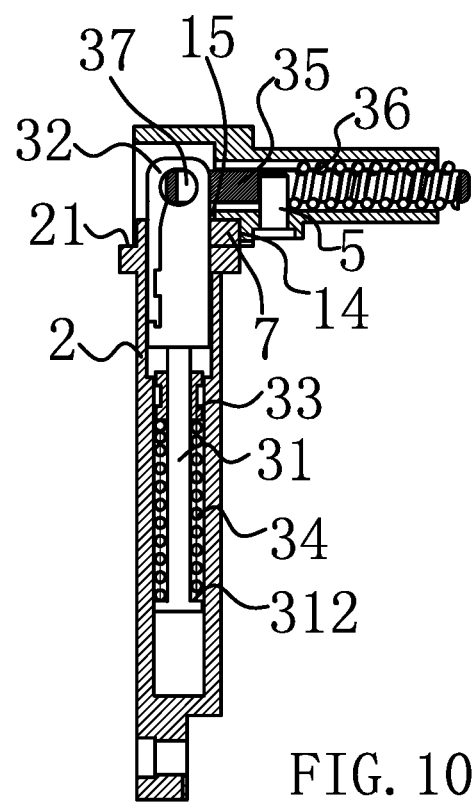
FIG. 10 is a cross-sectional view of the assembly for eyeglasses temple when the second connecting rod in FIG. 9 is rotated to a folded state.

Please refer to FIG. 7 along with FIG. 1, when one embodiment of the assembly for eyeglasses temple is in an unfolded state, a width of the protrusion 7 matches with a spacing between the blocking walls 8 or is slightly smaller than the spacing between the blocking walls 8. Under action of elasticity, the end portion 21 of the second connecting rod 2 is pressed tightly against the end face 12 of the end portion 11 of the first connecting rod 1, and the protrusion 7 on the end portion 21 of the second connecting rod 2 is located at the starting ends of the blocking walls 8 of the first connecting rod 1 to form an initial inserting connection state. As shown in FIG. 8, the protrusion 7 is located in a hollow cavity of the end portion 11 of the first connecting rod 1, that is, a lower portion of the protrusion 7 is located at the starting ends between the blocking walls 8, an upper portion of the protrusion 7 is located in the hollow cavity of the end portion 11 of the first connecting rod 1, a hooking position between the connecting ring 37 and the split ring 32 is also located in the hollow cavity of the end portion 11, and edge portions of the end portion 21 of the second connecting rod 2 are pressed tightly against the brims 13 of the outer peripheral side surface of the end portion 11 of the first connecting rod 1. Thereby the second connecting rod 2 can be rotated counterclockwise so that the lower portion of the protrusion 7 passes through the starting ends between the two blocking walls 8. During rotation of the second connecting rod 2, as shown in FIG. 9, the edge portions of the end portion 21 of the second connecting rod 2 abut against two fulcrums 17 of the brims 13, and the slide rod 35 is partially pulled out. In this way, the split ring 32 on the shaft 31 is rotatable about the connecting ring 37, the split ring 32 continues to rotate and bypasses a dead point, and the second connecting rod 2 is substantially perpendicular to the first connecting rod 1. The edge portions of the end portion 21 of the second connecting rod 2 abut against the brims 13 of the outer peripheral side surface of the end portion 11, and under action of contraction force of the slide rod 35, the slide rod 35 moves horizontally along the groove 16 and drives the protrusion 7 of the second connecting rod 2 to insert between the blocking walls 8. The end portion 21 of the second connecting rod 2 translates along the brims 13, and the protrusion 7 abuts against the limiting surface 14 to form a folded state of the assembly for eyeglasses temple, as shown in FIG. 10.

Figure 13:
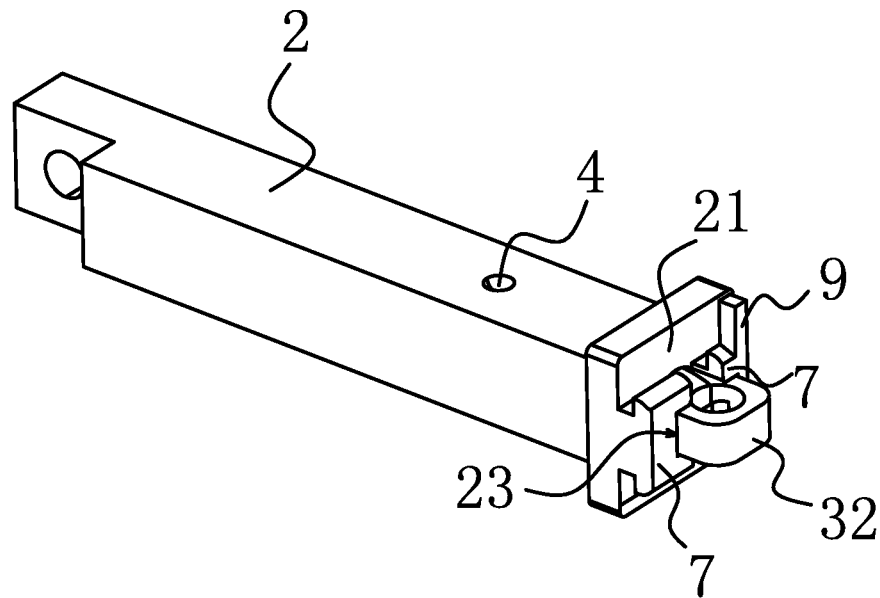
FIG. 13 is a perspective view of the structure of an anti-disengaging structure alternative in the first embodiment.

One embodiment of the block portion can be equivalently replaced by a structure as shown in FIG. 13, that is, a blocking boss 9 provided at an end of the protrusion 7. The blocking boss 9 can be abutted against the end face 12 of the end portion 11 after the protrusion 7 moves between the blocking walls 8. After such a block portion is used, the limiting surface 14 between the blocking walls 8 can be omitted.

As shown in FIG. 8, in order to facilitate mounting one embodiment of the connecting ring 37 into the split ring 32, the split ring 32 is elongated and includes a hook-shaped hook body 321 and an elastic snap-on plate 322 integrally connected with the hook body 321. The elastic snap-on plate 322 is an extension on a hook portion of the hook body 321, the elastic snap-on plate 322 extends to a side of the hook body 321 to seal the hook body 321, and the connecting ring 37 passes through between the elastic snap-on plate 322 and the hook body 321 to hook with the split ring 32. A corrugation is disposed between the elastic snap-on plate 322 and the hook body 321 capable of restricting movement of the elastic snap-on plate 322, that is, a first concave and convex connection 61 that restricts the elastic snap-on plate 322 from detaching along a radial direction of the hook body 321, and a second concave and convex connection 62 that restricts the elastic snap-on plate 322 from detaching along an axial direction of the hook body 321. Both the first concave and convex connection 61 and the second concave and convex connection 62 are protruding elements between the blocking walls 8 for cooperating with the blocking walls 8.

Embodiment 2

Figure 11:
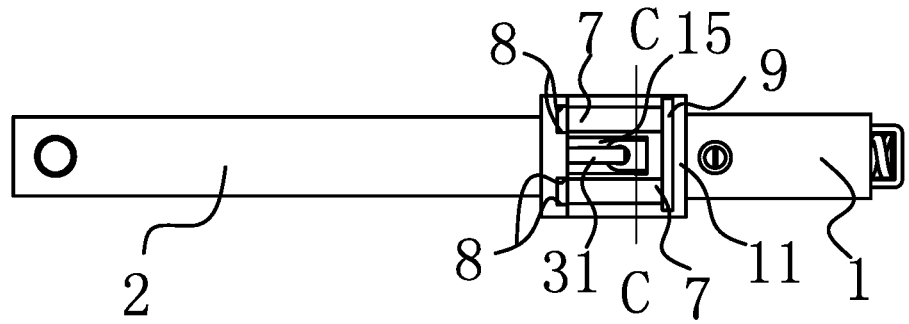
FIG. 11 is a schematic view of a second guiding structure according to a second embodiment of the present invention.
Figure 12:
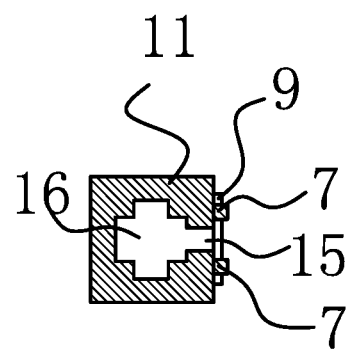
FIG. 12 is a cross-sectional view of C-C in FIG. 11 with the elastic component being removed.
Figure 14:
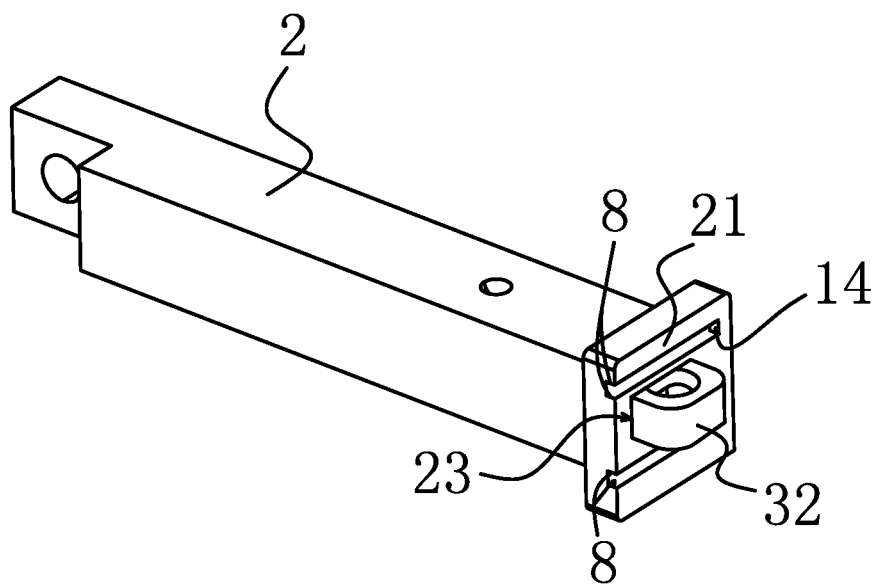
FIG. 14 is a perspective view of an anti-disengaging structure alternative in the second embodiment.

Embodiment 2 is the same as embodiment 1, the differences lie in the guiding structure. As shown in FIG. 11 and FIG. 12, the guiding structure includes the blocking walls 8 disposed on the end portion 21 of the second connecting rod 2, and the two elongated protrusions 7 disposed along the contraction direction of the elastic component 3 are provided on the outer peripheral side surface of the end portion 1 of the first connecting rod 1. When the end portion 21 of the second connecting rod 2 is rotated to reach the outer peripheral side surface of the end portion 1 of the first connecting rod 1, the protrusions 7 are inserted between the blocking walls 8. The passage 15 through which the elastic component 3 passes is disposed between the outer peripheral side surface on which the two protrusions 7 are disposed. The block portion is the blocking boss 9 provided at the ends of the protrusions 7, and the second connecting rod 2 can abut against the blocking boss 9 after moving on the protrusions 7. As shown in FIG. 14, the block portion can be equivalently replaced with the limiting surface 14 disposed between the ends of the blocking walls 8, and the second connecting rod 2 can abut against a starting end of the blocking boss 9 after moving on the protrusions 7. At the same time, the blocking boss 9 can be omitted.

Other structures are the same as those in embodiment 1, and thus are not described again.

The specific embodiments described herein are merely illustrative of the spirit of the present invention. Technical personnel skilled in the art to which the present invention pertains can make various modifications or additions to the specific embodiments described or replace them in a similar manner, without departing from the spirit of the present invention or beyond the scope defined by the appended claims.

LIST OF REFERENCED PARTS 1 first connecting rod
11 end portion
12 end face
13 brim
14 limiting surface
15 passage
16 groove
2 second connecting rod
21 end portion
23 guider through hole
17 fulcrum
3 elastic component
31 shaft
312 flange
32 split ring
321 hook body
322 elastic snap-on plate
33 bushing
331 annular groove
34 spring
35 slide rod
351 guide channel
36 coil spring
37 connecting ring
4 pin
5 bolt
61 first concave and convex connection
62 second concave and convex connection
7 protrusion
8 blocking wall
9 blocking boss

What is claimed is:

1. An assembly for eyeglasses temple comprising:
a first connecting rod and a second connecting rod each of which having an elastic component; and
a protrusion is provided on an end portion of the second connecting rod;
wherein outer ends of the two elastic components are hooked to each other to cause the second connecting rod and the first connecting rod to abut against each other;
wherein when the second connecting rod is rotated to a position perpendicular to the first connecting rod, the protrusion is inserted in and limited by an outer peripheral side surface of an end portion of the first connecting rod; and
wherein the outer peripheral side surface of the end portion of the first connecting rod has two blocking walls disposed in parallel to each other, a width of the protrusion is slightly smaller than a spacing between the two blocking walls, and the protrusion is inserted and limited between the two blocking walls.

2. The assembly for eyeglasses temple as claimed in claim 1, wherein brims of the two blocking walls are in one plane, the end portion of the second connecting rod is a plane, and the end portion of the second connecting rod abuts on the brims.

3. The assembly for eyeglasses temple as claimed in claim 1, wherein a block portion is disposed between the outer peripheral side surface of the end portion of the first connecting rod and the end portion of the second connecting rod capable of preventing the second connecting rod from disengaging from the blocking walls.

4. The assembly for eyeglasses temple as claimed in claim 3, wherein the block portion is a limiting surface disposed between ends of the two blocking walls, the protrusion is capable of abutting against the limiting surface, or the block portion is a blocking boss disposed at an end of the protrusion, and the blocking boss is capable of abutting against starting ends of the blocking walls.

5. The assembly for eyeglasses temple as claimed in claim 1, wherein the end portion of the first connecting rod is a hollow structure, a groove is provided on inner walls of the end portion, the groove capable of guiding the elastic component in a contracting direction, the elastic component disposed in the first connecting rod comprises a strip-shaped slide rod, the slide rod is provided with a strip-shaped guide channel in an axial direction, a coil spring is provided in the guide channel capable of acting between an inner end of the slide rod and the first connecting rod to contract the slide rod inwardly, and the slide rod is disposed in the groove.

6. The assembly for eyeglasses temple as claimed in claim 5, wherein the first connecting rod is fixed with a bolt, and the bolt projects into the guide channel of the slide rod and one end of the coil spring acts on the bolt.

7. The assembly for eyeglasses temple as claimed in claim 6, wherein an end face of the end portion is adjacent to and perpendicular to the outer peripheral side surface of the end portion on which the blocking walls are located.

8. The assembly for eyeglasses temple as claimed in claim 1, wherein the elastic component disposed in the second connecting rod comprises a shaft with an inner end having a flange, an outer end of the shaft is provided with a split ring, a bushing is fixed in the second connecting rod, the shaft is inserted in the bushing and around the shaft is sleeved with a spring having one end acting on the flange and another end acting on the bushing, the split ring protrudes outside of the second connecting rod and is fastened to a slide rod, the split ring comprises a hook-shaped hook body and an elastic snap-on plate connected integrally with the hook body, and a corrugation is disposed between the elastic snap-on plate and the hook body capable of restricting movement of the elastic snap-on plate.

* * * * *